United States Patent
O'Regan (12)

(10) Patent No.: US 6,266,233 B1
(45) Date of Patent: Jul. 24, 2001

(54) TEMPORARY POWER CENTER FOR UNDERGROUND RESIDENTIAL DISTRIBUTION SYSTEM

(75) Inventor: Timothy M. O'Regan, Leland, IL (US)

(73) Assignee: Electrical Materials Co., Genoa City, WI (US)

(*) Notice: Subject to any disclaimer, the term of this patent is extended or adjusted under 35 U.S.C. 154(b) by 0 days.

(21) Appl. No.: 09/532,064

(22) Filed: Mar. 21, 2000

(51) Int. Cl.$^7$ ........................................... H02B 1/00
(52) U.S. Cl. ..................... 361/659; 361/662; 361/663; 361/664; 361/672; 174/38
(58) Field of Search ........................ 361/659–662, 361/601, 641; 174/38, 45 R, 48, 49, 51, 58; 248/551

(56) References Cited

U.S. PATENT DOCUMENTS

| | | | | |
|---|---|---|---|---|
| 1,924,659 | * | 8/1933 | Schafer | 361/664 |
| 3,247,337 | * | 4/1966 | Wiegel | 200/43.22 |
| 3,440,330 | * | 4/1969 | Sloop | 174/52.1 |
| 3,450,951 | * | 6/1969 | Boyle | 361/664 |
| 3,585,456 | * | 6/1971 | Phillips, Jr. | 361/663 |
| 3,761,780 | * | 9/1973 | Plummer | 361/663 |
| 4,025,825 | * | 5/1977 | Shrader | 361/670 |
| 4,404,521 | * | 9/1983 | Fennell | 324/110 |
| 4,427,172 | * | 1/1984 | Cooper | 248/551 |
| 4,864,467 | * | 9/1989 | Byrd et al. | 361/664 |
| 4,887,187 | * | 12/1989 | Nickola | 361/664 |
| 5,404,266 | | 4/1995 | Orchard et al. | 361/667 |
| 5,638,256 | * | 6/1997 | Leach et al. | 361/641 |
| 5,726,507 | | 3/1998 | Tipton | 307/147 |
| 5,838,078 | | 11/1998 | Tipton | 307/147 |
| 6,046,904 | * | 4/2000 | Kubat | 361/659 |

* cited by examiner

Primary Examiner—Leo P. Picard
Assistant Examiner—Boris L. Chervinsky
(74) Attorney, Agent, or Firm—Emrich & Dithmar

(57) ABSTRACT

A single housing containing an electric power meter compartment and a circuit breaker-power receptacle compartment is adapted for use at a temporary construction site employing underground utility cables in a utility secondary cable enclosure. The meter compartment and circuit breaker-power receptacle compartment are disposed in a side-by-side arrangement in the housing which is adapted for secure mounting to a pedestal connected to the underground utility cables. The power circuit breakers and receptacles are protected from the environment by means of an overhanging access door pivotally attached to the power receptacle(s) compartment. The attached plug-type power load cable connections in the housing are also environmentally protected by means of the access door overhang. Disposed in the circuit breaker-power receptacle compartment is a receptacle to provide electric power on a temporary basis such as to a contractor during the construction phase of a housing development.

12 Claims, 5 Drawing Sheets

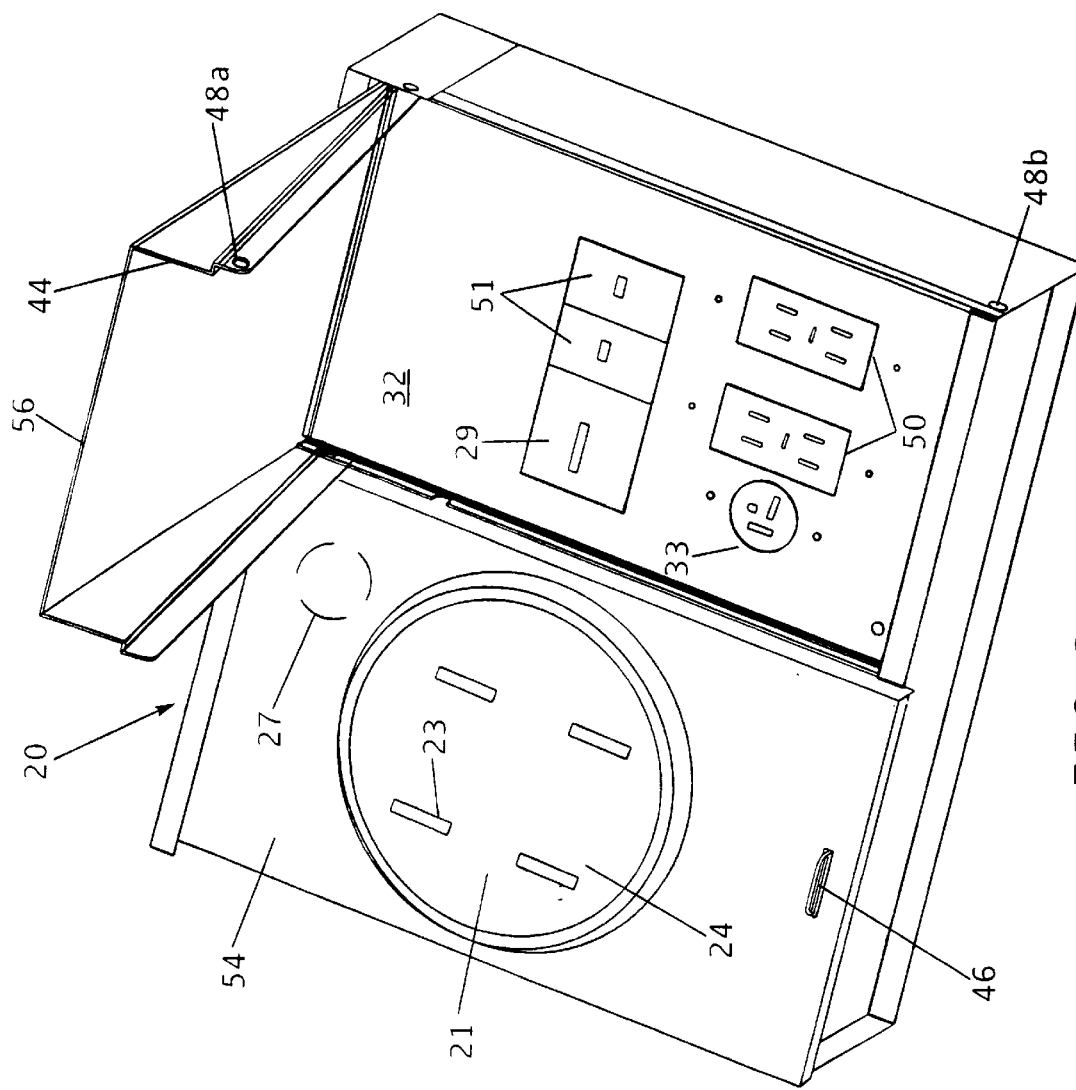
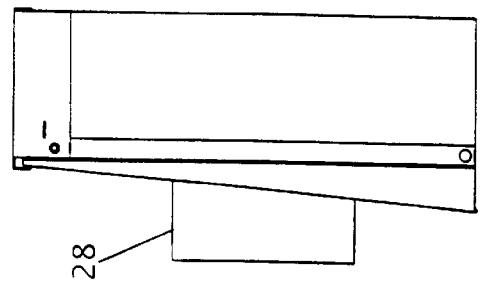
FIG. 3a
FIG. 3b

TEMPORARY POWER CENTER FOR UNDERGROUND RESIDENTIAL DISTRIBUTION SYSTEM

FIELD OF THE INVENTION

This invention relates generally to the distribution of electric power and is particularly directed to a temporary power center for connecting a contractor's plug-in cable to underground secondary cables such as in a residential distribution system such as during construction.

BACKGROUND OF THE INVENTION

There are currently available a variety of temporary enclosures owned and installed by contractors for providing temporary electrical service for building construction. Two of the more common enclosures are shown in FIGS. 1a and 1b. In the enclosure shown in FIG. 1a, an electric meter 10 is located below a circuit breaker-power receptacle compartment 17. A utility supply cable 11 is connected to the electric meter 10 and to a utility enclosure (not shown for simplicity), while the contractor's load cables 12 exit the enclosure from the circuit breaker-power receptacle compartment and extend such as to individual housing units in a housing development under construction. The enclosure is mounted to a temporary support post 13 which is typically comprised of wood or may be in the form of a pipe. In the enclosure shown in FIG. 1b, a utility supply cable is run from an existing power source and is connected to an electric meter 14 which is located above a circuit breaker-power receptacle compartment 18. A cable 15 connects the enclosure shown in FIG. 1b to underground cables (not shown). This enclosure is also mounted to a temporary support post 16. The contractor's load cables (not shown in the figure for simplicity) are run out of a lower portion of the enclosure and are available for the contractor to connect power tools.

The connection of the temporary power center to the electric utility enclosure is via cables protected by flexible waterproof conduit. The contractor's plug-in type take-off cable attachments include 90° connectors with 600 V insulated 3/c cable. This temporary electric power installation thus incorporates two separate remote enclosures, i.e., the meter connection enclosure and utility enclosure, connected by cables. This arrangement requires separate mounting arrangements for the two enclosures and presents a potential hazard in the exposed cables connecting these enclosures. In addition, the temporary mounting arrangement of the meter connection enclosure and associated exposed cables is aesthetically undesirable.

The present invention addresses the aforementioned limitations of the prior art by providing a temporary power center for an underground residential system including an electric meter and circuit breaker-power receptacle combination disposed in a side-by-side manner in a housing which is adapted for secure attachment to an electric utility enclosure.

OBJECTS AND SUMMARY OF THE INVENTION

Accordingly, it is an object of the present invention to provide a weatherproof electrical enclosure having outlet receptacles with circuit breaker protection and metered power for temporary electric service.

It is another object of the present invention to provide an electrical fixture incorporating an electric meter and a circuit breaker-power receptacle combination for direct connection to and mounting on an electric utility enclosure which affords improved safety and aesthetics.

It is yet another object of the present invention to provide an integrated electric meter/circuit breaker-power receptacle unit and electric utility enclosure for running power from a utility supply cable to plural electric cables such as in a housing development under construction.

This invention contemplates a power center for temporary connection of a contractor's plug-in cable to an underground electrical distribution system, wherein the electrical distribution system includes a ground-based pedestal and plural underground lines connected to the pedestal, the power center comprising a housing removably attached to an upper portion of the ground-based pedestal, the housing including first and second compartments arranged in a side-by-side manner and separated by a partition; an electric meter disposed in the first compartment and connected to the underground electrical distribution system; and a circuit breaker/power receptacle panel disposed in the second compartment and coupled to the electric meter, the circuit breaker/power receptacle panel including a receptacle for providing electric power on a temporary basis to the contractor's plug-in cable.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 3a and 3b are respectively front perspective and side elevation views of a temporary power center incorporating an electric meter and a circuit breaker-power receptacle combination in accordance with the present invention;

DETAILED DESCRIPTION OF THE PREFERRED EMBODIMENTS

Figure 1A:
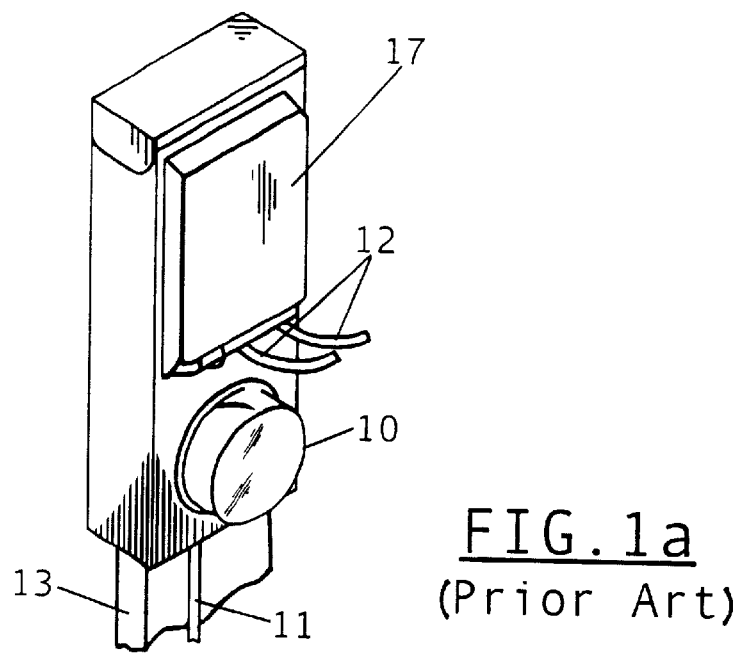
FIGS. 1a and 1b are perspective views of two prior art electrical enclosures used for providing temporary electrical service for building construction.
Figure 1B:
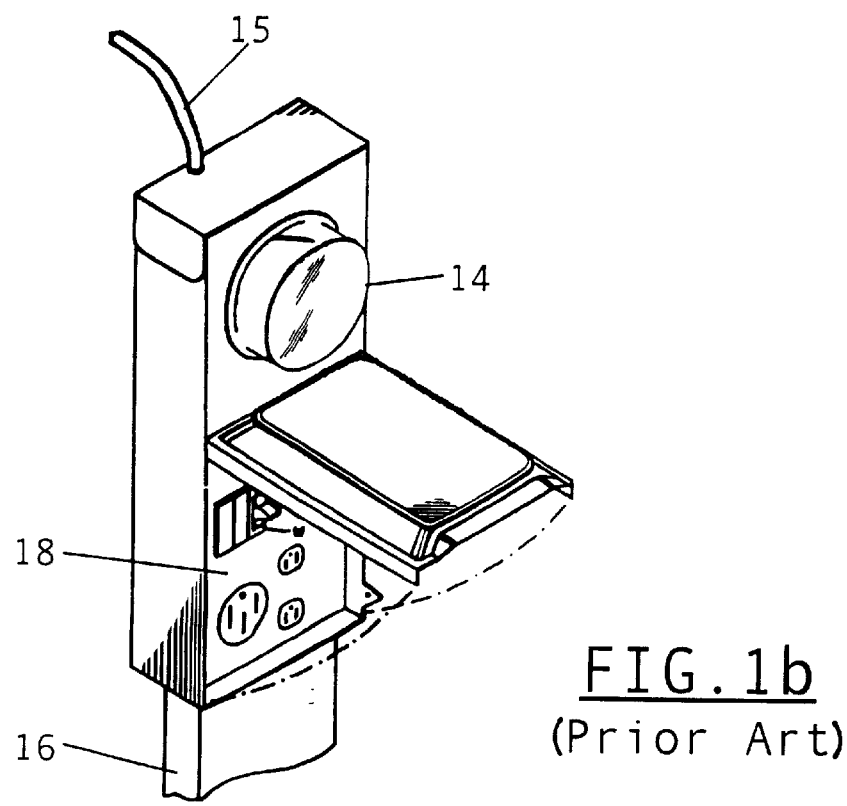
Figure 2:
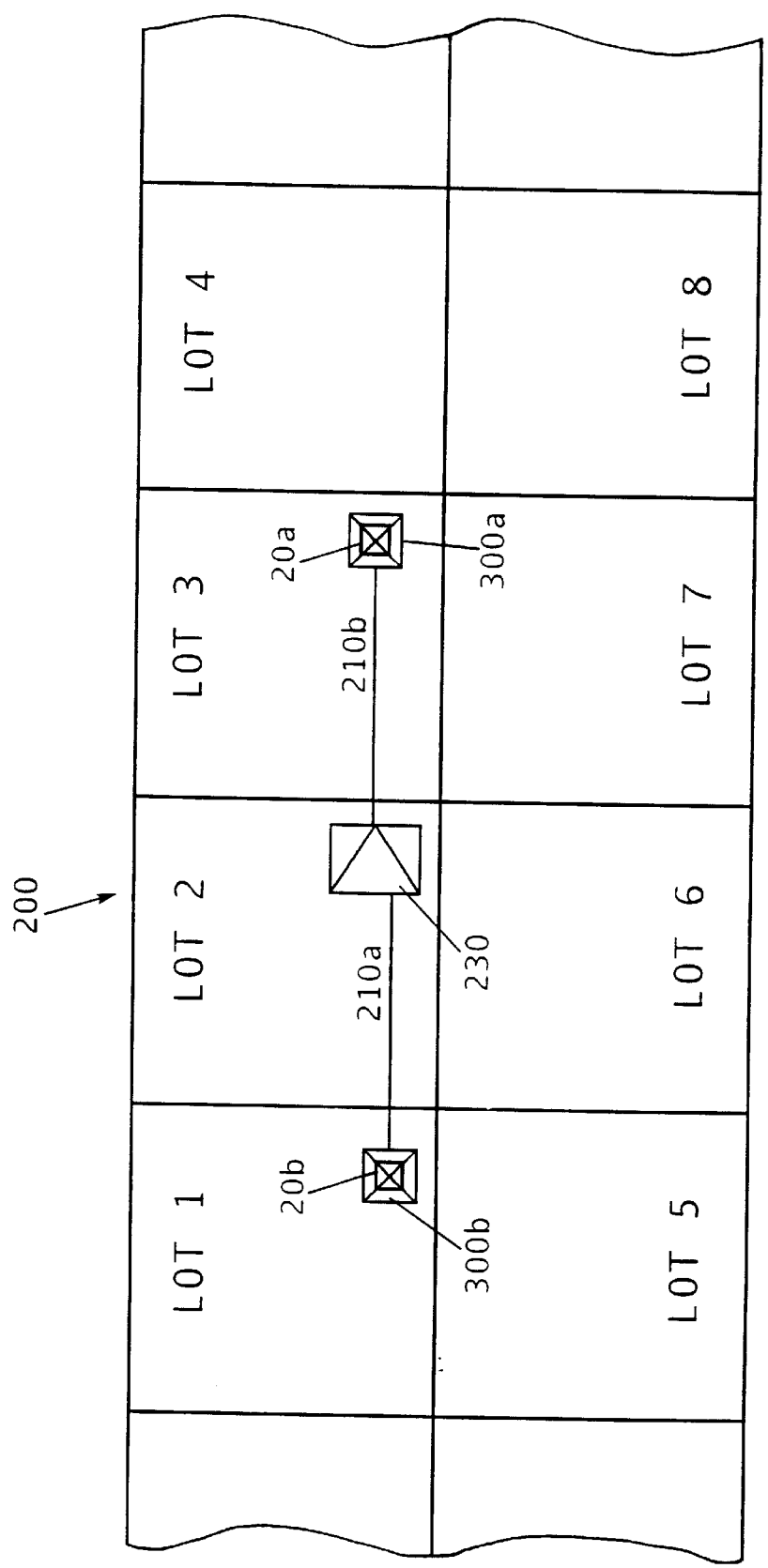
FIG. 2 is a simplified schematic diagram illustrating the typical permanent rear lot residential low voltage distribution system incorporating a pad mounted transformer and plural secondary pedestal terminating points for individual houses.
Figure 4:
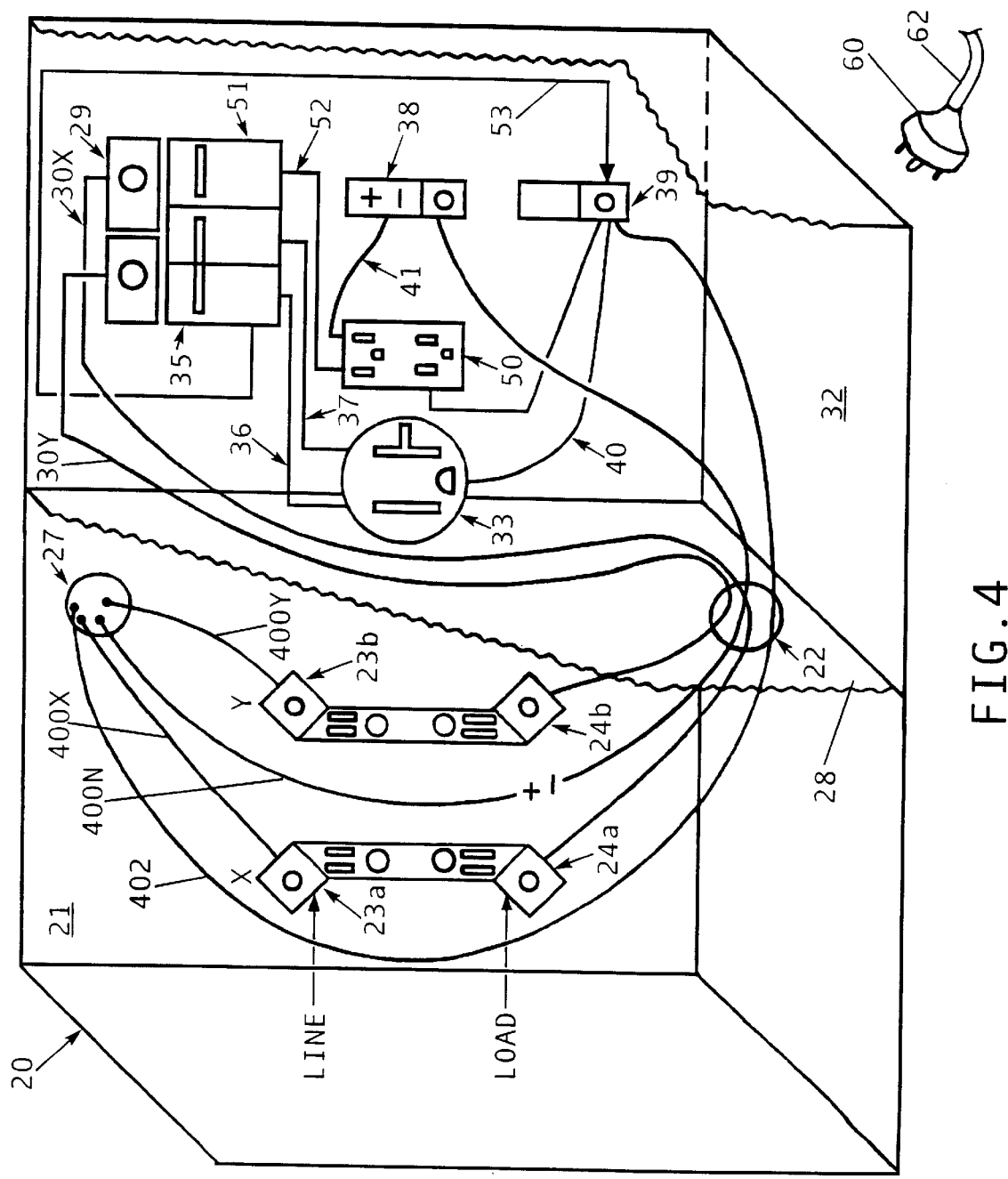
FIG. 4 is a simplified schematic diagram showing the arrangement of electrical components in the temporary power center of the present invention.

Referring to FIG. 2, there is shown a simplified schematic diagram of a typical permanent residential rear lot low voltage distribution system 200 used in a housing development which includes several lots. The low voltage distribution system 200 includes a pad mounted transformer 230 and several main secondary lines 210a and 210b. The secondary lines 210a and 210b are respectively connected to secondary pedestal terminating points 300b and 300a. Each of the secondary pedestal terminating points 300a, 300b includes a respective power center 20a and 20b in accordance with the present invention. The low voltage distribution system 200 shown in the figure is typically installed prior to the construction of residences on the lots because of the convenience and lower utility installation costs associated with uninhibited access for construction equipment. As shown in the figure, temporary power centers 20a and 20b are installed respectively on pedestal 300a and 300b to service lots 1 through 8. After construction is complete, permanent electric connections are made.

The combined compact power center 20 according to the invention is shown in FIGS. 3a, 3b, 4 and 5 and includes a meter compartment 21 having a meter socket. The meter socket includes line side terminals 23a and 23b connected to the electrical utility low voltage secondary system by means of power wires 400X, 400Y and 400N and a grounding wire 402 entering the housing 20 through an aperture 27 located in the back of the housing.

Load side terminals 24a and 24b of the meter sockets connect with a circuit breaker bus 29 by means of cables 30X and 30Y, respectively. Cables 30X and 30Y pass through a protected aperture 22 in a metallic barrier, or wall, 28 that deters meter tampering by the public between the meter compartment 21 and breaker/receptacle compartment 32. Ground conductor 40 connects the power center housing's ground bus 39 to utility system ground.

A low voltage (250 volt) receptacle 33 connects with the load side of the ground fault interrupter (GFI) circuit breakers by means of conductors 36 and 37. The housing's ground bus 39 is connected to receptacle 33 by means of conductor 40. An isolated neutral bus 38 is connected to ground fault circuit protected breakers and receptacles by means of conductor 41. A 120 volt GFI receptacle 50 is connected to circuit breaker 51 by means of conductor 52. Conductor 41 connects the GFI receptacle 50 to the isolated neutral bus 38. A GFI breaker 35 is connected to the ground bus 39 by means of conductor 53. The 250 volt receptacle 33 and the 120 volt GFI receptacle 50 allow for temporary access to electric power such as by a contractor during the construction phase of a housing development using a plug 60 and cable 62 combination.

Attached to a forward portion of the power center 20 are first and second pivoting doors 54 and 56. The first pivoting door 54 is disposed over the meter compartment 21, while the second pivoting door 56 is disposed over the breaker/receptacle compartment 32. The first pivoting door 54 is attached to the housing of the power center 20 above the meter compartment and extends below the lower edge of the meter compartment so as to protect the public from electrical shock. Similarly, the second pivoting door 56 is pivotally attached to the housing of the power center 20 above the breaker/receptacle compartment 32 and extends below the lower edge of the breaker/receptacle compartment so as to isolate the circuit components within the breaker/receptacle compartment from the elements. A cable run slot 44 is disposed in a lower edge of the second pivoting door 56 to facilitate running a contractor load cable from the breaker/receptacle compartment 32. A first aperture 48a in a lower edge of the second pivoting door 56 is aligned with a second aperture 48b in a lower portion of the housing of the temporary power center 20 when the second pivoting door is in the closed position. The aligned apertures 48a, 48b permit a securing device such as a lock (not shown for simplicity) to be inserted in the aligned first and second apertures 48a, 48b for securely maintaining the second pivoting door 56 in position so as to prevent the unauthorized use of electricity. Similarly, a slot and aperture combination 46 adjacent a lower edge of the first pivoting door 54 is adapted to receive a lock (also not shown in the figure for simplicity) for securely maintaining the first pivoting door in a closed position to prevent tampering with the electric meter in the meter compartment 21.

The compact horizontal configuration of the meter and receptacle housing 20 mounts safely and easily to the electrical utility's pedestal enclosure lid as described below. This type of mounting eliminates the need for flexible pipe with cables for connection to the utility's secondary system.

Figure 5:
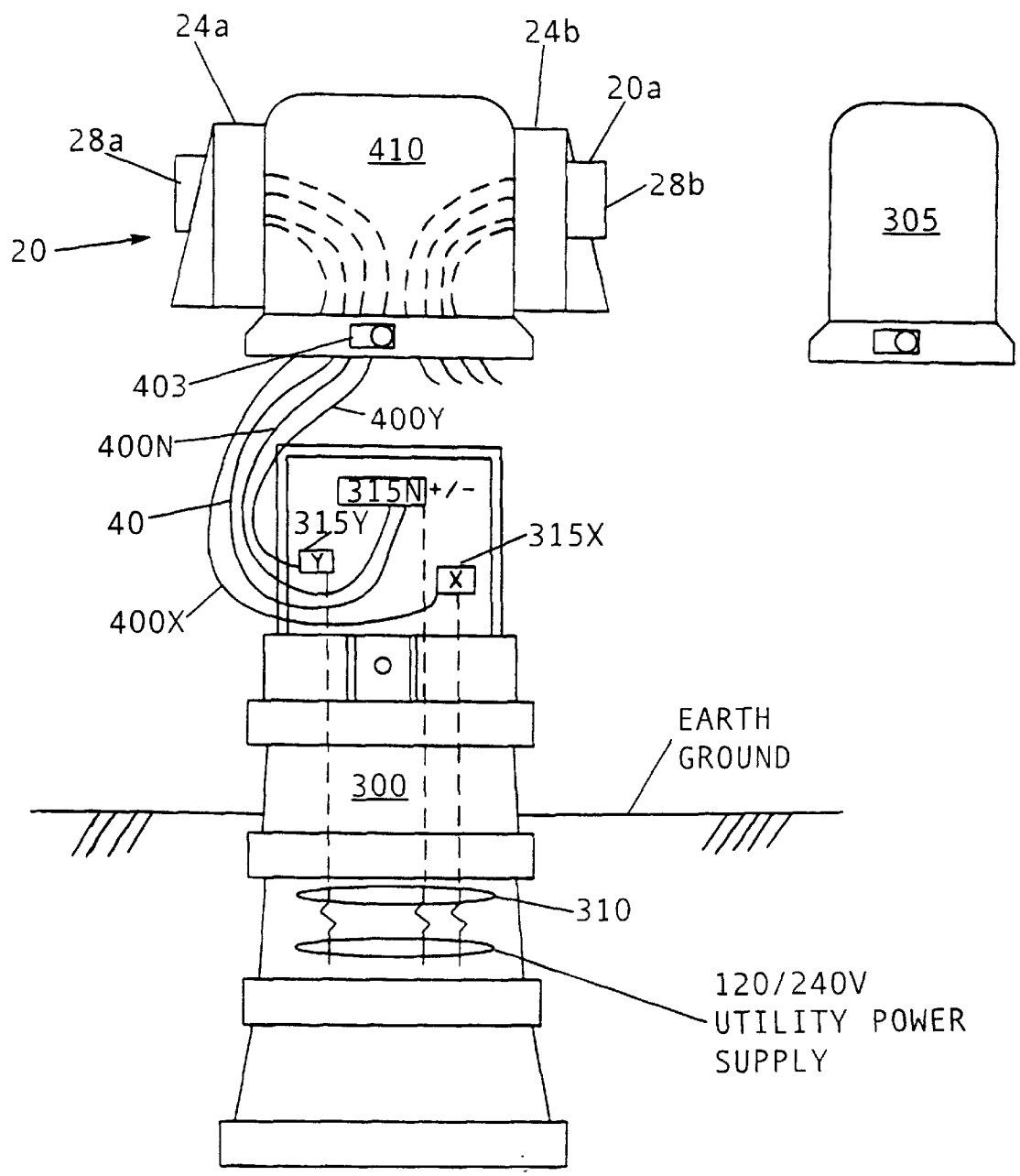
FIG. 5 is a side elevation view shown partially exploded and partially in phantom of a temporary power center in accordance with the present invention mounted to an electric utility enclosure.

With specific reference to FIG. 5, the procedure used for installing and removing a temporary power center involves the following steps. First, a permanent pedestal lid 305 is removed from the upper portion of a secondary pedestal base 300. As shown in the figure, power source cables 310 extend from the ground and are connected to secondary bus connectors 315N, 315X and 315Y. Source cables 400X, 400Y and 400N, which are connected at one end to a temporary power center 20 as described above, are connected at their opposed ends to respected secondary bus connectors 315N, 315X and 315Y. The temporary power center 20 is attached to a pedestal lid 410. The pedestal lid 410 is then slid over the upper end of the secondary pedestal base 300 and is locked into place by means of a security lock 403. If required, a second temporary power center 20a may also be attached to the pedestal lid 410 for connection by another contractor. The voltage at the source terminal of the meter socket are then checked and a meter is installed for energizing the circuit breaker bus in the breaker/receptacle compartment. When temporary service is no longer required, the circuit breakers are first placed on the OFF position and the power meter is removed for de-energizing the load center bus in the breaker/receptacle compartment of the temporary power center 20. Temporary pedestal lid 210 including the first and second temporary power centers 20 and 28 is then removed from the upper portion of the secondary pedestal base 300. Source cables 400X, 400Y, 400N and the case grounding wire 402 are then disconnected from pedestal base connectors 315X, 315Y, and 315N. The permanent standard pedestal lid, or cover, 305 is then reinstalled on the upper end of the secondary pedestal base 300.

A temporary power center in accordance with the present invention can thus easily and quickly be installed on a secondary pedestal base. When temporary service is no longer required, the temporary power center is easily removed from the upper end of the secondary pedestal base and the permanent pedestal lid is attached to the secondary pedestal base. The temporary power center of the present invention would typically be maintained in the inventory of an electric utility for easy installation by utility personnel as a quick response to contractor requests. While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A power center for temporary connection of a contractor's plug-in cable to an underground electrical distribution system, wherein said electrical distribution system includes a ground-based pedestal and plural underground lines connected to said pedestal, said power center comprising:
- a housing including first and second compartments arranged in a side-by-side manner and separated by a partition;
- a releasable connector arrangement for removably attaching said housing to the ground-based pedestal;
- an electric meter disposed in said first compartment and connected to the underground electrical distribution system; and
- a circuit breaker/power receptacle panel disposed in said second compartment and coupled to said electric meter, the circuit breaker/power receptacle panel including a receptacle for providing electric power on a temporary basis to the contractor's plug-in cable.

2. The power center of claim 1 further comprising a removable cover disposed over said circuit breaker/power receptacle panel and having a cable run slot for accommodating a power take-off cable for temporary use by the contractor.

3. The power center of claim 2 wherein said removeable cover is pivotally coupled to said housing above said circuit breaker/power receptacle panel and extends below said circuit breaker/power receptacle panel for providing environmental protection for said power take-off cable and said circuit breaker/power receptacle panel.

4. The power center of claim 3 further comprising locking means for locking said removable cover in position over said circuit breaker/power receptacle panel to prevent unauthorized use of electricity.

5. The power center of claim 4 wherein said locking means includes first and second apertures respectively disposed in said housing and said removeable cover, wherein said first and second apertures are aligned when said removeable cover is in a closed position and are adapted to receive a locking mechanism.

6. The power center of claim 1 further comprising a removable cover disposed over said electric meter for shielding said electric meter for safety.

7. The power center of claim 6 further comprising locking means coupled to said removable cover for locking said removable cover in position over said electric meter in a closed position.

8. The power center of claim 7 wherein said locking means includes a slot in said removeable cover and a tab with a aperture extending from said first compartment, and wherein said tab is inserted through said slot when said removeable cover is in the closed position and the aperture in said tab is adapted to receive a locking mechanism to maintain said removeable cover in the closed position and prevent tampering with said electric meter.

9. The power center of claim 8 wherein said removeable cover is pivotally coupled to said housing above said first compartment and extends below said first compartment for preventing tampering with said electric meter.

10. The power center of claim 1 wherein said housing further includes third and fourth compartments arranged in a side-by-side manner and separated by a partition, and wherein said third and fourth compartments respectively include a second electric meter coupled to the underground electrical distribution system and a second circuit breaker/power receptacle panel coupled to said second electric meter and including a receptacle for providing electric power on a temporary basis to a second contractor's plug-in cable.

11. A power center for temporary connection of a plug-in cable to an underground electrical distribution system having a ground-based pedestal, said power center comprising:
- a housing having first and second compartments arranged in a side-by-side manner and separated by a partition, wherein said first compartment and said partition respectively include first and second apertures;
- an electric meter disposed in said first compartment and coupled to first cables extending through said first aperture;
- a circuit breaker/power receptacle panel disposed in said second compartment and coupled to said electric meter by means of second cables extending through said second aperture, said circuit breaker/power receptacle panel including a receptacle for providing electric power on a temporary basis to the plug-in cable; and
- a releasable connector arrangement for removably attaching said housing to the ground-based pedestal when electric power is provided to the plug-in cable.

12. The power center of claim 11 further comprising first and second removeable covers attached to said housing and respectively disposed over said first and second compartments for preventing electrical shock and unauthorized use of electricity.

* * * * *